(12) United States Patent
Tincknell et al.

(10) Patent No.: US 7,222,885 B2
(45) Date of Patent: May 29, 2007

(54) DRAIN SEAL FOR VEHICLE DRAIN TUBE

(75) Inventors: Lyle D. Tincknell, Oxford, MI (US);
Darryl T. Bradley, Goodrich, MI (US);
James D. Grant, Lapeer, MI (US);
Timothy J. Stuart, Lapeer, MI (US);
James E. Ostrander, Rochester Hills, MI (US); Daniel E. Snead, Redford, MI (US)

(73) Assignee: Cooper Standard Automotive, Inc., Novi, MI (US)

( * ) Notice: Subject to any disclaimer, the term of this patent is extended or adjusted under 35 U.S.C. 154(b) by 177 days.

(21) Appl. No.: 10/786,954

(22) Filed: Feb. 25, 2004

(65) Prior Publication Data
US 2005/0184470 A1    Aug. 25, 2005

(51) Int. Cl.
*F16L 5/00* (2006.01)
(52) U.S. Cl. ................ 285/140.1; 285/285.1; 285/423; 29/890.14
(58) Field of Classification Search ........... 285/136.1, 285/140.1, 295.2, 296.1, 285.1, 423, 921; 29/890.14
See application file for complete search history.

(56) References Cited

U.S. PATENT DOCUMENTS

| | | | | |
|---|---|---|---|---|
| 2,889,089 A | * | 6/1959 | Herrick et al. ............. 285/383 |
| 3,134,519 A | * | 5/1964 | Tidd ......................... 285/136.1 |
| 3,408,092 A | * | 10/1968 | Appleton .................. 285/136.1 |
| 3,424,481 A | * | 1/1969 | Fulghum ................... 285/140.1 |
| 3,650,551 A | * | 3/1972 | Akers ........................ 285/143.1 |
| 3,758,138 A | * | 9/1973 | Roseman .................. 285/139.3 |
| 3,973,732 A | * | 8/1976 | Diggs ......................... 239/271 |
| 4,368,915 A | | 1/1983 | Torii |
| 4,541,665 A | | 9/1985 | Draper et al. |
| 4,892,351 A | | 1/1990 | Ono et al. |
| 5,009,464 A | | 4/1991 | Hasegawa et al. |
| 5,209,546 A | | 5/1993 | Hasegawa et al. |
| 5,353,472 A | * | 10/1994 | Benda et al. ................ 16/2.2 |
| 5,460,413 A | * | 10/1995 | Sampson ................... 285/21.3 |
| 5,902,008 A | | 5/1999 | Butsuen et al. |
| 5,961,177 A | | 10/1999 | Caye et al. |
| 6,189,961 B1 | | 2/2001 | Poliskie et al. |

* cited by examiner

*Primary Examiner*—David Bochna
(74) *Attorney, Agent, or Firm*—Young Basile Hanlon MacFarlane & Helmholdt

(57) ABSTRACT

A drain seal for connecting a drain tube to a support structure includes a molded unitary body having first and second moldingly joined portions, each formed of dissimilar durometer materials. The first portion is formed to sealingly join the body to a drain tube. The second portion is formed to mount the body in an aperture in a support structure. A bore extends completely through the body.

15 Claims, 3 Drawing Sheets

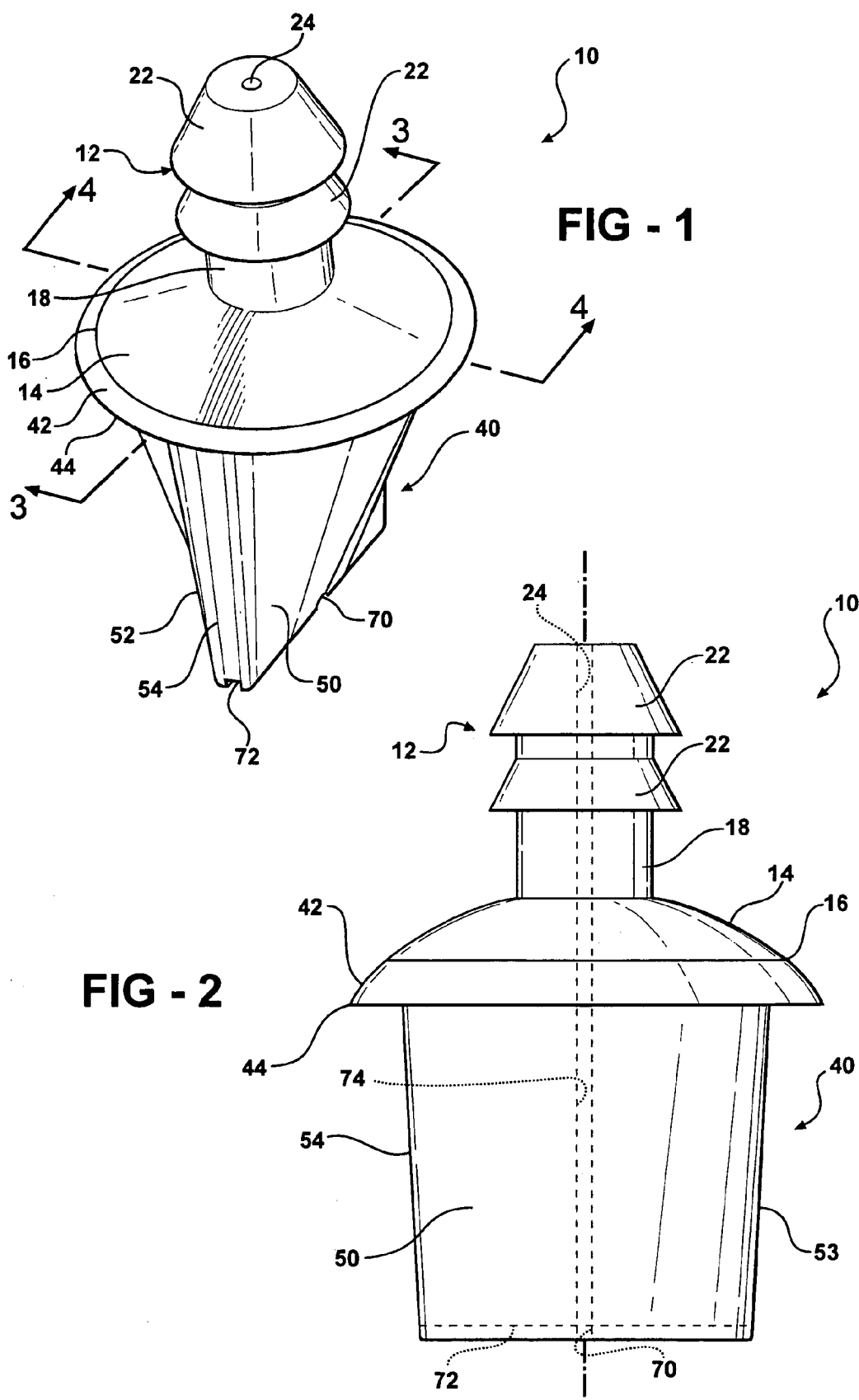

DRAIN SEAL FOR VEHICLE DRAIN TUBE

BACKGROUND

Sun roof assemblies are a common option in automotive vehicles. Such sun roof assemblies can be of the tilting and/or sliding type and have a panel mounted in a roof opening in the vehicle. The panel is moveably supported in a pair of longitudinally extending guide rails affixed to the vehicle roof A trough extends around the edge of the roof opening and collects water when the sun roof panel is open or if any water passes through the sealing structure typically employed with the sun roof panel. This drain trough is connected to one or more drain tubes which are typically run through the vehicle body side pillars. A lower end of the tube is open to allow water to be discharged from the vehicle.

The bottom of the drain tube receives a drain seal which provides the dual functions of fixing one end of the drain tube to the vehicle body structure as well as providing a small, one way opening to allow water collected by the drain tube to exit the drain tube while at the same time preventing the entry of water or debris into the lower end of the drain tube.

Prior drain seals have been formed of two separate elements which are joined together, typically by an adhesive. The two different elements have different shapes to serve different functions as well as being formed of different materials to again serve specific, different functions. One of the elements is formed of a softer durometer material to serve as a seal to the vehicle body structure. The other element is typically formed of a higher durometer material for fixed mounting of the drain seal to the drain tube.

While effective, the prior art drain seals involve multiple parts which must be joined together. This increases the cost of the drain seal.

It would be desirable to provide a drain seal for an automotive vehicle which can be manufactured at a lower cost while still providing all of the required functions of a drain seal.

SUMMARY

The inventive drain seal provides all the functions of a typical drain seal for a sun roof drain tube while, at the same time, having a unitary one piece construction thereby eliminating secondary assembly operations for lower manufacturing costs and improved reliability.

The inventive drain seal mounts a drain hose to a vehicle support structure while allowing drainage of fluid from the attached drain hose. In one aspect, the drain seal includes a molded, unitary, monolithic body having first and second moldingly joined portions, the first portion formed of a material having a first durometer and carrying means for sealingly joining the body to a drain hose. The second portion is formed of a material having a second durometer, and includes means for mounting the body in an aperture in a structure. A bore extends through the body from one end of the first portion to an opposite end of the second portion. A bond between the first and second portions is a chemical bond.

At least one enlargement formed on the first portion. The at least one enlargement has an outer diameter larger than an inner diameter of a drain hose. A surface having a diameter greater than a diameter of the stem of the first portion. An annular recess is formed between the surface and a mounting end of the second portion, the recess defining a surface for receiving a panel in the body. The first portion is joined to the second portion at the surface of the first portion. A drain end extends from the surface. The drain end has exterior surface tapering inward along two mutually opposed axes. At least one slot is formed in the drain end of the second portion. The at least one slot is fluidically coupled to the bore extending through the body. Optionally, a pair of intersecting slots are formed in the drain end of the second portion and extending from the bore through the body.

In another aspect, the present invention is a method of forming a drain seal including the steps of molding a unitary body of first and second moldingly joined portions in a double shot molding operation, forming the first portion of a material having a first durometer, forming the second portion of a material having a second lower durometer, forming a bore extending through the body from one end of the first portion of the body to an opposite end of the second portion of the body, forming the first durometer material of a higher durometer than the second durometer material of the second portion of the body, forming a sealing means on the first portion of the body for joining the body to a drain hose, forming a mounting means on the second portion of the body for mounting the body in an aperture in a structure, forming enlarged ends for the first and second portions, the enlarged ends moldingly joined and forming an annular undercut or recess between a drain and of the second portion of the body and an end surface of the body.

BRIEF DESCRIPTION OF THE DRAWING

The various features, advantages and other uses of the present invention will become more apparent by referring to the following detailed description and drawing in which:

FIG. 1 is a perspective view of a drain seal constructed in accordance with the teachings of the present invention;

FIG. 2 is a side elevational view of the drain seal shown in FIG. 1;

DETAILED DESCRIPTION

Figure 3:
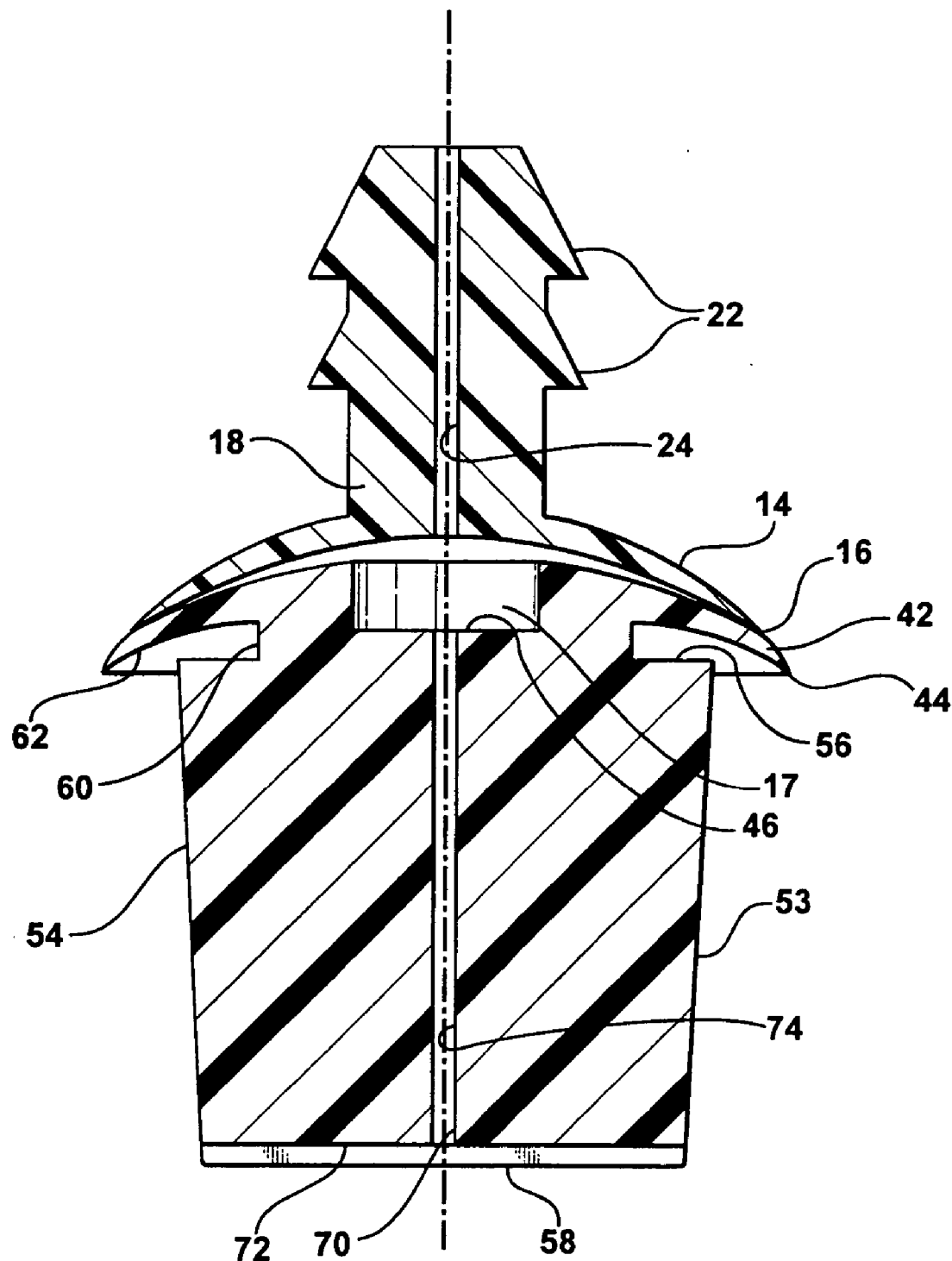
FIG. 3 is a cross-sectional view generally taken along line 3—3 of FIG. 1.

Referring now to FIGS. 1–4, there is depicted a drain seal 10 constructed in accordance with the teachings of the present invention. The drain seal 10 is uniquely formed as a one piece, monolithic body of two dissimilar different durometer materials which are chemically bonded together. The drain seal 10 includes a first element or portion 12 having a base 14 of a generally dome-like shape and a hemispherical shaped cross-section as shown in FIG. 2 extending from a central axis to an exterior peripheral edge. As also shown in FIG. 2, the peripheral edge 16 depends in an arcuate fashion with respect to the central axis.

A leg 17 extends centrally from one side of the base 14. A stem 18 projects from an opposite side of the base 14. Tube joining means 20 are formed on the stem 18. By way of example only, the tube joining means includes one or more angularly extending barbs 22. The barbs 22 forcibly expand a drain tube 23 shown in FIG. 3, outward during insertion of the stem 18 into one end of the tube 23 and conforms the tube 23 which is generally formed of a softer durometer material, to the shape of the barbs 22 thereby resisting separation of the tube 23 from the drain seal 10.

A longitudinal bore 24 extends through the stem 18, the base 14 and the lower leg 17.

According to the present invention, the first element 12 is formed of a high durometer material, such as high density polypropylene (HDPP).

The drain seal 10 also includes a second element or portion 40 which is formed of a lower durometer material than the material used to form the first element 12. By example only, the second element 40 is formed of a thermoplastic rubber (TPR), such as SANOPRENE. Again, by example, 60 durometer SANOPRENE may be employed as the material for the second element 40.

While the material used to form the second element 40 is dissimilar from the material used to form the first element 12 of the drain seal 10, the two materials are selected so as to form a chemical bond during a two shot molding operation.

For example, the first element 12 can be initially formed in a mold. While still in the mold, material for the second element 40 is injected into the mold and, due to the elevated temperatures associated with the molding operation, chemically bonds to the material forming the first element 12 to form a monolithic, one-piece structure for the drain seal 10.

Figure 4:
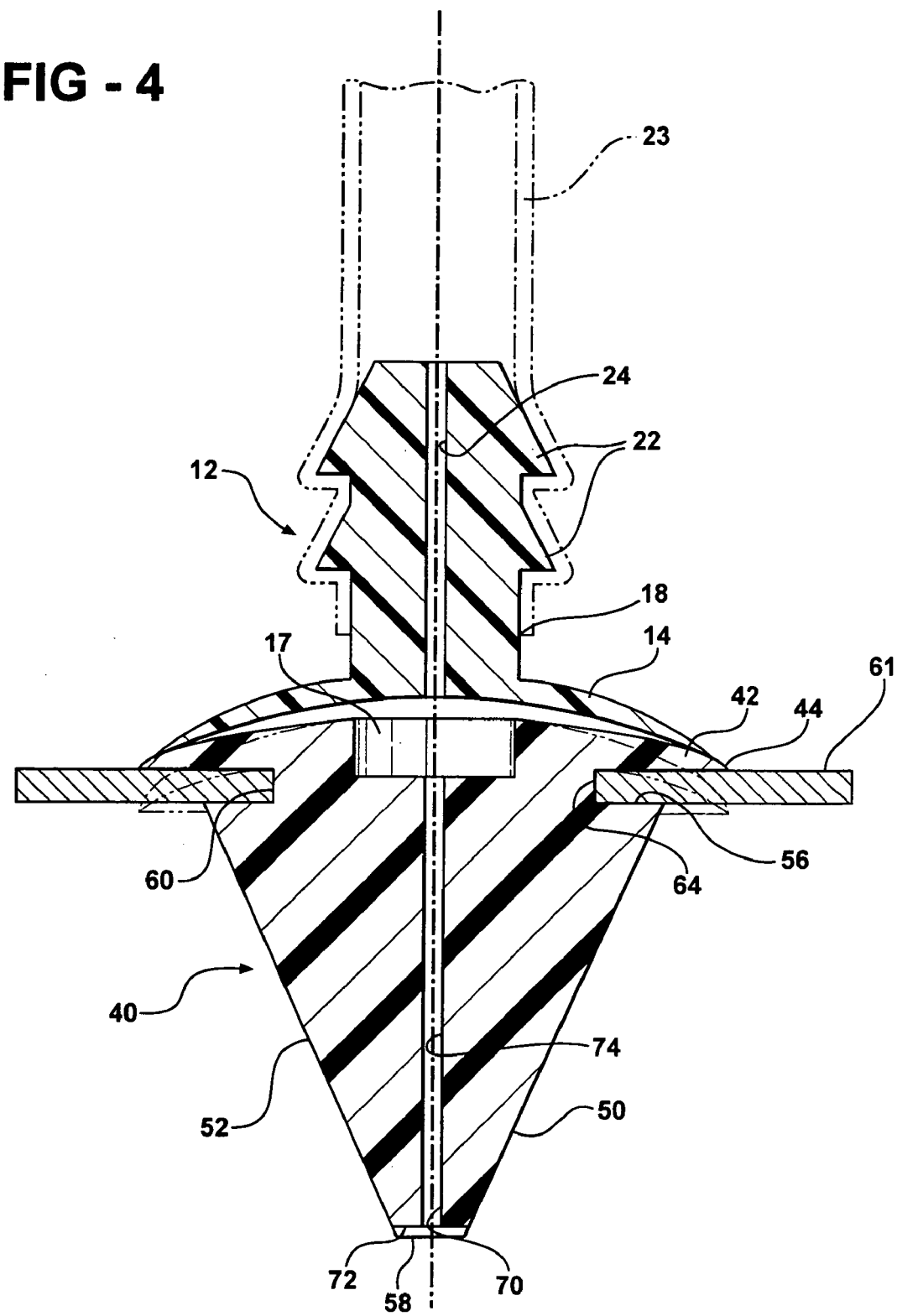
FIG. 4 is a cross-sectional view generally taken along line 4—4 of FIG. 1.

As shown in FIGS. 1–4, the second element 40 has an upper rim 42 formed with a peripheral edge 44 and having a generally dome-shaped cross-section. The rim 42 contacts the base 14 of the first element 12. A central open-ended recess 46 is formed in the second element 40 complementary to and receiving the central leg 17 of the first element 12 as shown in FIG. 4.

It should be noted that while the recess 46 has been described as a structural feature of the second element 40, it will be understood that the recess 40 is not actually pre-formed, but merely defines wall structure which surrounds or is formed about the leg 17 of the first element 12 when the second element 40 is double shot molded about the first element 12.

As shown in FIG. 1, when the second element 40 is molded about the first element 12, the rim 42 of the second element 40 will surround the inner surface and the peripheral edge 16 of the base 14 of the first element 12. These mating surfaces define the interface in which a chemical bond is formed between the materials forming the first and second elements 12 and 40 to unitarily join the first and second elements 12 and 40 into a unitary, monolithic, one piece structure.

The second element 40 includes a lower portion 46 which is formed with opposed major sidewalls 50 and 52 and an intervening, opposed, side edges 53 and 54 all of which taper in two axes from a larger diameter first end 56 to a smaller diameter second end 58.

The second element 40 has a mounting portion formed by an undercut or recess 60 between the inner surface of the rim 42 and the first end 56. The recess 60 has a generally annular shape extending inward from an open end adjacent the outer surface of the side walls 50 and 52 and the side edges 53 and 54.

The softer durometer material used to form the second element 40 provides compression to enable the second element 40 to be inserted through an aperture 64 in a vehicle body structure, such as a sheet metal panel 66 shown in FIG. 2, until the inner edges of the panel surrounding the aperture slide into the recess 50 in the second element 40. The adjacent rim 42 of the second element 40 and the base 14 of the first element 12 provide an ergonomic surface to facilitate the insertion of the drain seal 10 through an aperture in a vehicle support structure or panel. Further, the arcuate shape of the rim 42 of the second element 40 and the base 14 of the first element 12 provide a resiliency or biasing force against the panel 66 to assist in retaining the drain seal 10 in the vehicle support structure or panel 66.

As shown in FIGS. 1–4, the lower end of the second element 40 has at least one and preferably a pair of intersecting slots 70 and 72 formed at the end 58 of the second element 40. The slots 70 and 72 are formed as open-ended slots extending inward from the second end of the second element 40. The slots 60 and 62 intersect at the central axis of the second element 40 and are fluidically coupled to a bore 74 extending through the second element 40 and the contiguous bore 24 extending through the first element 12. The slots 60 and 62 facilitate egress or drainage of fluid through the bores 24 and 74 in the drain seal 10 regardless of the orientation of the vehicle.

Thus, to form the drain seal 10, the first element 12 is initially formed in a mold. While the material forming the first element 12 is still at an elevated temperature, a different material used to form the second element 40 is injected into the mold and joins to the base 14 of the first element 12 at the interface described above when the rim 42 is formed as part of the second element 40.

Next, the stem 18 of the first element 12 of the drain seal 10 is inserted into an open end of a drain tube 23 to fixedly join the stem 18 to the drain tube 23 and to establish fluid communication between the bores 24 and 74 in the drain seal 10 with the interior bore in the drain tube 23.

It should be noted that the assembly of the drain seal 10 to the drain tube 23 can take place in the manufacturing facility of the sunroof or other structure using the drain tube 10. This enables the drain tube 10 to be shipped to the vehicle assembly plant as part of the overall sunroof or other structure which contains the drain tube 10.

When the sunroof or other structure is mounted in a vehicle, drain tube 23 and attached drain seal 10 is routed through the appropriate vehicle body structure, such as one of the side pillars. The installer then grasps the base 14 and rim 42 and forcibly urges the lower portion 46 of the second element 40 through the aperture 64 in the vehicle body structure or panel 66 until the panel 66 snaps into the recess 60 in the second element 40. It should be noted, as shown in FIG. 3, that the engagement of the panel 66 in the recess 60 causes a deformation of the peripheral edges of the rim 42 and possibly the base 14. This causes an inherent resilient force to be formed in the rim 42 and possibly the base 14 which biases the drain seal 10 into engagement with the panel 66.

The slots 70 and 72 in the second end 58 of the second element 40 of the drain seal 10 are now positioned to provide a drainage outlet for water flowing through the drain tube 23 and the bores 24 and 74 in the drain seal 10.

What is claimed is:

1. A drain seal for use with a drain tube in a structure having an aperture, the drain seal comprising:
   a unitary body having first and second double shot moldingly joined portions;
   the first portion formed of a material having a first durometer;
   the second portion formed of a material having a second durometer;
   a bore extending through the body from one end of the first portion of the body to an opposite end of the second portion of the body;
   a mount carried on the second portion adapted for mounting the body in an aperture in a structure, the mount including:
   a rim having a diameter greater than an outer diameter of the first portion; and an annular recess formed between the rim and one end of the second portion, the recess adapted for receiving a surface in a structure.

2. The drain seal of claim 1 wherein:
the first durometer of the material forming the first portion is higher than the second durometer of the material forming the second portion of the body.

3. The drain seal of claim 1 further comprising:
an extension formed centrally on the first portion;
the second portion surrounding and receiving the extension of the first portion.

4. The drain seal of claim 1 further comprising:
a joint carried on the first portion adapted for sealingly joining the body to a drain tube.

5. The drain seal of claim 4 further comprising;
at least one enlargement formed on the first portion.

6. The drain seal of claim 5 wherein the at least one enlargement has an outer diameter larger than an inner diameter of a drain tube.

7. A drain seal for use with a drain tube in a structure having an aperture, the drain seal comprising:
a unitary body having first and second moldingly joined portions;
the second portion formed of a material having a durometer different from a durometer of the first portion;
a bore extending through the body from one end of the first portion of the body to an opposite end of the second portion of the body; and
a mount carried on the second portion adapted for mounting the body in an aperture in a structure, the mount including:
a rim in the second portion having a diameter greater than an outer diameter of the first portion;
the first portion joined to the second portion within the rim of the second portion; and
an annular recess formed between the rim and one end of the second portion, the recess adapted for receiving a surface in a structure.

8. The drain seal of claim 7 wherein the second portion further comprises:
a drain end extending from the rim.

9. The drain seal of claim 8 wherein:
the drain end has exterior surface tapering inward along two mutually opposed axes.

10. The drain seal of claim 8 further comprising:
at least one slot formed in the drain end, the at least one slot fluidically coupled to the bore extending through the body.

11. The drain seal of claim 10 wherein the at least one slot comprises
pair of intersecting slots formed in the drain end and fluidically coupled to the bore extending through the body.

12. A method for firming a drain seal for use with a drain tube and a structure having an aperture, the method comprising the steps of:
double shot molding a unitary body of first and second moldingly joined portions;
forming the first portion of a material having a first durometer;
forming the second portion of a material having a second durometer;
forming a bore extending through the body from one end of the first portion to an opposite end of the second portion; and
forming a mount on the second portion of the body adapted for mounting the body in an aperture in a structure by forming an annular undercut between a drain end of the second portion of the body and an end surface of the body.

13. The method of claim 12 further comprising the step of:
forming the first durometer material with a higher durometer than the second durometer material.

14. The method of claim 12 further comprising the step of:
forming a joint on the first portion of the body adapted for sealingly joining the body to a drain tube.

15. The method of claim 12 further comprising the steps of:
forming enlarged ends for the first and second portions; and
moldingly joining the enlarged ends.

* * * * *